United States Patent
Heinemann et al.

(10) Patent No.: US 9,429,363 B2
(45) Date of Patent: Aug. 30, 2016

(54) LIFT AND PIVOT DEVICE FOR A COVER OF A FURNACE AND FURNACE SYSTEM AND METHOD FOR CHARGING AND SERVICING SUCH A FURNACE SYSTEM

(75) Inventors: Carlo Heinemann, Offenburg (DE); Michael Schmid, Biberach/ Baden (DE); Uwe Wilhelm, Willstätt-Legelshurst (DE)

(73) Assignee: PRIMETALS TECHNOLOGIES AUSTRIA GmbH, Linz (AT)

( * ) Notice: Subject to any disclaimer, the term of this patent is extended or adjusted under 35 U.S.C. 154(b) by 604 days.

(21) Appl. No.: 13/877,188

(22) PCT Filed: Sep. 29, 2011

(86) PCT No.: PCT/EP2011/066960
§ 371 (c)(1),
(2), (4) Date: Apr. 1, 2013

(87) PCT Pub. No.: WO2012/041947
PCT Pub. Date: Apr. 5, 2012

(65) Prior Publication Data
US 2013/0208755 A1    Aug. 15, 2013

(30) Foreign Application Priority Data

Sep. 30, 2010  (DE) .................. 10 2010 041 692

(51) Int. Cl.
*F27D 1/02*  (2006.01)
*F27B 3/16*  (2006.01)
(Continued)

(52) U.S. Cl.
CPC ............... *F27B 3/16* (2013.01); *C21C 5/527* (2013.01); *F27B 3/085* (2013.01); *F27B 3/18* (2013.01); *F27B 3/183* (2013.01); *F27D 1/1816* (2013.01); *Y02P 10/216* (2015.11)

(58) Field of Classification Search
CPC .......... C21C 5/527; F27B 3/085; F27B 3/16; F27B 3/18; F27B 3/183; F27D 1/1816; H05B 7/102; H05B 7/109; H05B 7/156
USPC ...... 373/73, 79, 81, 98, 52, 69, 94, 99, 105, 373/106; 91/216 R; 92/117 A, 117 R
See application file for complete search history.

(56) References Cited

U.S. PATENT DOCUMENTS

| 2,114,230 A | * | 4/1938 | Moore ...................... F27D 3/18 266/200 |
| 4,423,515 A | * | 12/1983 | Riegler ................... F27B 3/085 373/81 |

(Continued)

FOREIGN PATENT DOCUMENTS

| AT | 370871 | 5/1983 |
| AT | 393731 | 12/1991 |

(Continued)

OTHER PUBLICATIONS

International Search Report for PCT/EP2011/066960, mailed on Jan. 18, 2012.

(Continued)

*Primary Examiner* — Dana Ross
*Assistant Examiner* — Joseph Iskra
(74) *Attorney, Agent, or Firm* — Staas & Halsey LLP

(57) ABSTRACT

A lift and pivot device for a cover of a furnace including a guide housing having a base plate, a rotatably mounted slide roller, and a vertical opening; a lift pin that can be lifted and lowered inside the vertical opening; a lift cylinder for lifting and lowering the lift pin, the lift cylinder being articulated to the lift pin at one end as well as articulated and rotatably connected to the base plate at the other end; and a guide frame for carrying the cover. The guide frame includes a support arm, wherein an upper end of the support arm is equipped for connection to the cover and includes a lift nose having a lift eye which is in engagement with an end of the lift pin facing away from the lift cylinder. The support arm at the other end thereof has a slide plate.

20 Claims, 9 Drawing Sheets

(51) Int. Cl.
*C21C 5/52* (2006.01)
*F27B 3/08* (2006.01)
*F27B 3/18* (2006.01)
*F27D 1/18* (2006.01)

(56) References Cited

U.S. PATENT DOCUMENTS

| | | | | |
|---|---|---|---|---|
| 4,443,880 | A | * | 4/1984 | Buhler ............... F27B 3/16 373/74 |
| 4,476,564 | A | * | 10/1984 | Buhler ............... F27D 11/08 373/81 |
| 4,670,884 | A | * | 6/1987 | Letizia ............... H05B 7/103 373/101 |
| 4,674,102 | A | * | 6/1987 | Ehle ............... F27B 3/085 373/81 |
| 4,841,542 | A | * | 6/1989 | Zajicek ............... C21C 5/5211 373/73 |
| 4,866,731 | A | | 9/1989 | Zajicek et al. |

FOREIGN PATENT DOCUMENTS

| | | |
|---|---|---|
| CN | 201292377 Y | 8/2009 |
| CN | 201340194 Y | 11/2009 |
| CN | 201434595 Y | 3/2010 |
| DE | 3514293 | 10/1986 |
| DE | 10332866 | 3/2004 |
| DE | 102010041692.4 | 9/2011 |
| EP | 0077319 | 4/1983 |
| EP | 0209735 | 1/1987 |
| EP | 0291497 | 11/1988 |
| JP | CN201292377 * | 8/2009 |
| RU | 2061942 | 6/1996 |
| SU | 35986 | 4/1934 |
| WO | 2009/109335 | 9/2009 |
| WO | PCT/EP2011/066960 | 9/2011 |

OTHER PUBLICATIONS

German Office Action for related German Patent Application No. 10 2010 041 692.4, issued Dec. 2, 2013, 5 pages.

Office Action issued Apr. 28, 2014 for corresponding Chinese Patent Application No. 2011800408867, 12 pages.

Russian Notice of Allowance for related Russian Patent Application No. 2013119390/02(028700), issued Nov. 3, 2015, 12 pages (including partial German Translation).

* cited by examiner

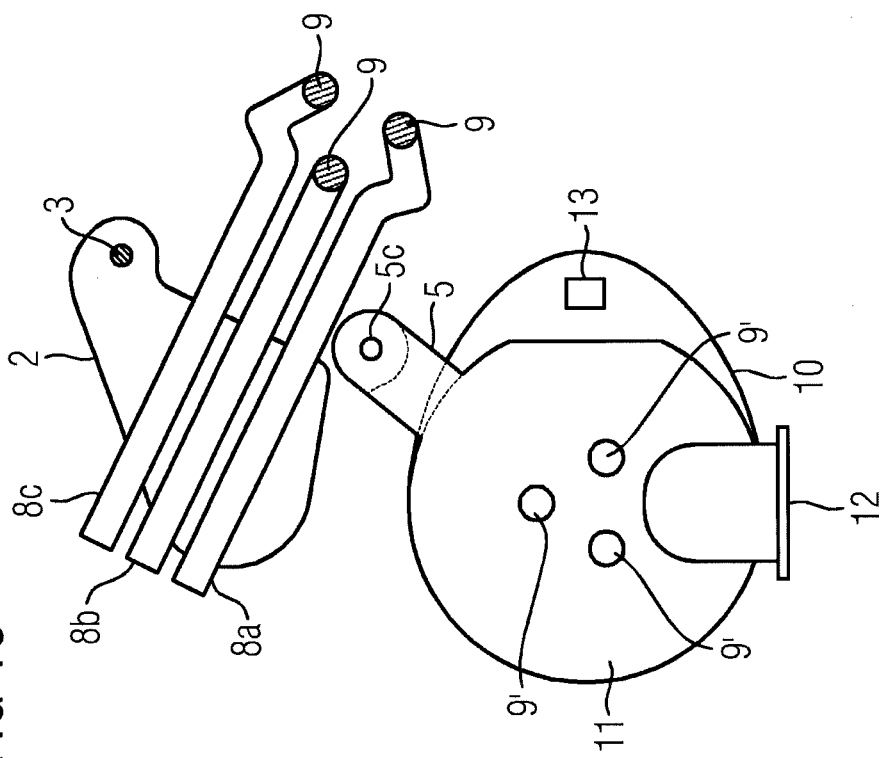
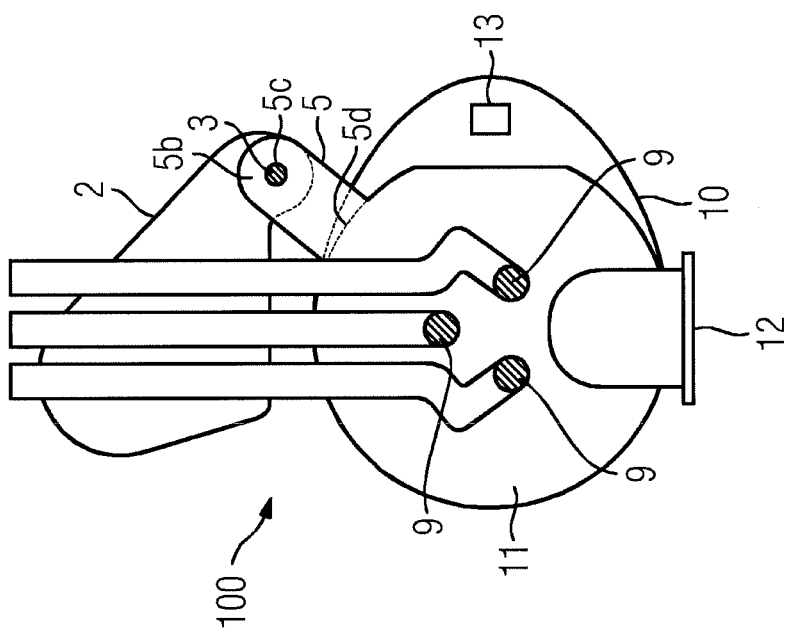

LIFT AND PIVOT DEVICE FOR A COVER OF A FURNACE AND FURNACE SYSTEM AND METHOD FOR CHARGING AND SERVICING SUCH A FURNACE SYSTEM

CROSS REFERENCE TO RELATED APPLICATIONS

This application is based on and hereby claims priority to International Application No. PCT/EP2011/066960 filed on Sep. 29, 2011 and German Application No. 10 2010 041 692.4 filed on Sep. 30, 2010, the contents of which are hereby incorporated by reference.

BACKGROUND

The invention relates to a lift and pivot device for a cover of a furnace, and also a furnace system equipped therewith, in particular an electric arc furnace system. The invention furthermore relates to a method for use with such a furnace system.

In order to charge a furnace, in particular an electric arc furnace, where primarily scrap metal is charged as the charge material, a furnace vessel of the electric arc furnace normally closed during the melting process is opened. To this end, electrode carrying arms which are present with electrodes attached thereto and also the cover of the furnace are lifted and pivoted to the side with a rotational movement. Normally this is done by rotating these assemblies around a common pivot point. The charge material is then introduced into the furnace vessel, the assemblies are pivoted back into the original position and lowered again such that the furnace vessel is closed again and the next melting process can be started.

Lift and pivot devices of the type mentioned in the introduction are already known inter alia from DE 35 14 293 A1. Here it is described that the device comprises a liftable and pivotable support member which engages on the edge of the cover. A lift device is fastened on a laterally pivotable frame arranged beside the furnace vessel. In the lowered position the support member is released from the edge of the cover. On being raised it engages with a lift eye, matched to the form of the support member, on the edge of the cover.

EP 0 077 319 A1 describes an electric furnace having a lifting mechanism operating a furnace cover. The lifting mechanism has a fixed support pin and a lifting device arranged inside the support pin, which actuates a lifting column which is to engage with and disengage from the furnace cover. The lifting column is guided in axially movable fashion on the support pin by an upper and a lower bearing. The lifting device, in particular in the form of a hydraulic cylinder, is connected at one end in articulated fashion to the lifting column and at the other end in articulated fashion to a fixed part of the system, such as a base or the support pin.

Large masses are normally moved by such a lift and pivot device, during which process high axial and vertical forces are generated on the rotation and guide bearings of the lift and pivot device. This results in high material stress levels and renders necessary recurring servicing work and strict controls. To ensure correct lifting and lowering of the cover, the guide bearings must therefore not exceed certain tolerances in order to avoid jamming or wedging of the guide facilities and/or of the lift cylinders used.

SUMMARY

One potential object is to specify a lift and pivot device with a particularly low servicing requirement, and a furnace system equipped therewith. A further potential object is to specify a suitable method for charging and servicing such a furnace system.

The inventors propose a lift and pivot device for a cover of a furnace, in particular an electric arc furnace, in that the device comprises:
- a guide housing having a base plate, at least one rotatably mounted slide roller and a vertical opening,
- a lift pin which can be lifted and lowered inside the vertical opening in the guide housing,
- a lift cylinder for lifting and lowering the lift pin, the lift cylinder being connected at one end in articulated fashion to the lift pin and at the other end in articulated fashion and rotatably to the base plate, and
- a guide frame for carrying the cover, the guide frame comprising a support arm, wherein an upper end of the support arm is equipped for connection to the cover, and furthermore comprising a lift nose having a lift eye which can be engaged with an end of the lift pin facing away from the lift cylinder, wherein the support arm has at its other end at least one slide plate, wherein a lateral face of the at least one slide roller can roll on the at least one slide plate during the lifting and lowering of the lift cylinder.

Constraint forces in the cylinder are reliably avoided on account of the articulated mounting of the lift cylinder. Because the lift cylinder is not part of the lift pin, the lift cylinder can be replaced quickly and cost-effectively in the event of a fault. The at least one slide roller minimizes the friction between guide frame and guide housing, which means that any wear in the contact area between guide frame and guide housing is reduced. The lift and pivot device can as a result be serviced particularly quickly and the servicing cycles can be extended to particularly long intervals. Thanks to the arrangement of the at least one slide roller on the guide housing, the forces acting thereon are minimized and a less massive and thus cost-effective embodiment of the guide housing can be implemented. Furthermore, the at least one slide roller is particularly well protected in this arrangement against contamination and temperature rise.

The object is achieved for a furnace system, in particular an electric arc furnace system, in that the furnace system comprises a furnace having a furnace vessel and a cover for the furnace vessel, and also a lift and pivot device connected to the cover, wherein the cover is fastened on the upper end of the guide frame with respect to the lift nose on the support arm and the guide housing is arranged pivotably around a vertical axis of rotation with respect to the furnace vessel.

Because the lift and pivot device can be serviced particularly quickly and the servicing cycles can be extended to particularly long intervals, this consequently results in an increased availability of a furnace system equipped with the lift and pivot device, which has a favorable effect on the performance and the operating costs of the furnace system.

It is particularly preferable if the at least one slide roller is connected to an automatic lubricant supply system. On account of the arrangement of the at least one slide roller on the guide housing, it is possible to employ a central lubricant supply facility for automatic lubrication of the at least one slide roller. The servicing requirements are further reduced by this means.

It has proved to be of value if the slide plates are designed to be replaceable, for example capable of being bolted or clamped to the guide frame. This enables simple servicing of the guide frame and furthermore the use of different thicknesses of slide plates and also the use of shims between guide frame and slide plate in order to influence the positioning of the support arm of the guide frame and/or to adapt to the state of the slide rollers.

In particular, it has furthermore proved to be of value for the lift and pivot device if a sealing device of variable length is fastened at one end on the guide housing and at the other end on the end of the lift pin facing the lift nose, which sealing device radially surrounds the part of the lift pin raised in the direction of the lift nose from the guide frame during the lifting and lowering of the lift cylinder. In this situation, the sealing device of variable length is preferably formed by a tubular bellows seal.

The sealing device serves to reliably prevent dust, sparks or corrosive media entering the vertical opening in the guide housing or the space between lift pin and guide housing, which may possibly result in the lift pin seizing up or jamming inside the vertical opening of the guide housing. The servicing requirements for the lift and pivot device are thereby enormously reduced.

It has moreover proved to be of value for the lift and pivot device if the at least one slide roller is rotatable around a slide roller axis of rotation, the position of which can be adjusted with respect to the guide housing. This means that a longitudinal axis of the support arm of the guide frame can be quickly and unproblematically oriented vertically.

In the case of wear to the at least one slide roller and/or slide plate after a certain period of operation of the lift and pivot device the location of the longitudinal axis of the support arm changes, the longitudinal axis no longer being oriented vertically but forming an angle to the vertical. In the case of a furnace system this has the result that incorrect positioning of the cover occurs with respect to the furnace vessel. The cover is no longer oriented exactly horizontally but at an angle to the horizontal, which means that in the worst case an undesired collision with the furnace vessel occurs on pivoting the already raised cover. This can result in damage to the cover and/or the furnace vessel and/or the lift and pivot device.

The capability to adjust the position of the slide roller axis (axes) of rotation makes it possible to counteract wear of the slide roller(s) and/or slide plate(s), which means that a collision between cover and furnace vessel can be avoided over a long period of time without there being any need to exchange or replace components of the lift and pivot device.

In a particularly preferred embodiment of the lift and pivot device, the guide housing has two slide rollers and the guide frame has two slide plates, one slide roller being able to roll on one slide plate in each case. The transmission of force into the guide housing is thereby evened out.

In this situation it is particularly preferred if the slide roller axes of rotation lie in a horizontal plane and are oriented in a V-shape with respect to one another, wherein a tip of the V, which corresponds to a virtual point of intersection of the slide roller axes of rotation, points away from the guide frame. The two planes in which the respective surfaces of the slide plates lie are in this case likewise oriented in a V-shape with respect to one another, wherein a further tip of the further V, which corresponds to a virtual line of intersection of the planes, points toward the guide housing. The advantage of this arrangement relates to the fact that the slide rollers take over the guidance and centering of the guide frame. Separate devices for positionally accurate orientation of the guide frame with respect to the guide housing can be dispensed with.

In a preferred embodiment of the lift and pivot device, the end of the lift pin facing away from the lift cylinder is designed as tapering, in particular conical or hemispherical. The guide frame is thereby mounted in a floating manner.

The dimensional tolerances which the lift eye may exhibit are thereby increased. Any wedging of the lift and pivot device is reliably avoided.

It has proved to be of value if a centering device for positioning the guide frame with respect to the guide housing when the lift pin has been lifted is present. The centering device serves as a type of emergency safety device in order to secure the cover of the furnace in the lifted position. This can be necessary for example if a scrap basket being used to charge the furnace vessel collides with the lifted, pivoted cover of the furnace or if the cover in the lifted, pivoted state is accidentally lifted by a crane. An embodiment of the centering device which has proved to be of particular value here comprises a guide pin arranged on the guide housing and a holding fixture comprising a centering opening for receiving the centering pin arranged on the guide frame.

Furthermore, provision can be made with regard to the lift and pivot device, in particular inasmuch as the device is used on an electric arc furnace, such that at least one electrode carrying arm which is liftable and pivotable with respect to the guide housing is connected to the guide housing. At least one further lift cylinder is normally employed in order to lift and pivot the at least one electrode carrying arm.

The object is achieved for the method for charging a furnace system, in particular an electric arc furnace system, involving the following:

lifting the lift pin by the lift cylinder, wherein the end of the lift pin facing away from the lift cylinder engages with the lift eye, the guide frame together with cover is lifted and the at least one slide plate is moved upward on the at least one slide roller, pivoting the guide housing including the guide frame and the cover around the vertical axis of rotation from an operating position, in which the furnace vessel is closed by the cover, into a charging position in which the cover uncovers the furnace vessel, charging the furnace vessel with charge material to be melted, in particular scrap metal, pivoting the guide housing including the guide frame and the cover around the vertical axis of rotation from the charging position back into the operating position and lowering the lift pin by the lift cylinder, wherein the guide frame together with cover is lowered and the at least one slide plate is moved downward on the at least one slide roller.

The method is particularly wear-free and can thus be carried out over long periods of time without requiring time-consuming servicing.

The inventors also propose a method for servicing a furnace system, in particular an electric arc furnace system, the method involving:

lowering the lift pin by the lift cylinder in an operating position in which the furnace vessel is closed by the cover, wherein the end of the lift pin facing away from the lift cylinder slides out of the lift eye and the at least one slide plate is moved downward on the at least one slide roller, pivoting the guide housing around the vertical axis of rotation from the operating position into a servicing position, wherein the cover remains on the furnace vessel, servicing the lift and pivot device and/or another part of the furnace system, and pivoting the guide housing around the vertical axis of rotation from the servicing position back into the operating position.

The method enables quick and cost-effective servicing of the lift and pivot device and/or another part of the furnace system.

With regard to both methods, it has proved to be of value if prior to the pivoting of the guide frame around the vertical axis of rotation from the operating position into the charging position or servicing position, if present, the at least one electrode carrying arm is lifted with respect to the guide housing and the cover, and after the pivoting of the guide housing around the vertical axis of rotation from the charging position or servicing position back into the operating position the at least one electrode carrying arm is lowered with respect to the guide housing and the cover.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 17 shows a top view of the furnace system in the operating position according to FIG. 15;

FIG. 18 shows a top view of the furnace system in a servicing position; and

DETAILED DESCRIPTION OF THE PREFERRED EMBODIMENT

Figure 1:
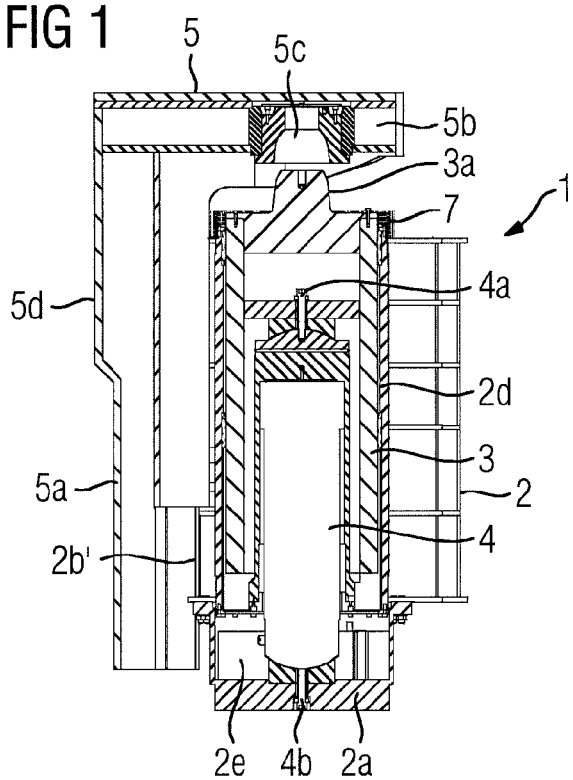
FIG. 1 shows a side view of a lift and pivot device in longitudinal section.

Reference will now be made in detail to the preferred embodiments of the present invention, examples of which are illustrated in the accompanying drawings, wherein like reference numerals refer to like elements throughout.

FIG. 1 shows a side sectional view of a lift and pivot device 1, wherein a guide housing 2 comprising a base plate 2a, two rotatably mounted slide rollers 6, 6' not visible here (see FIG. 4) and a vertical opening 2d is present. Furthermore, a liftable and pivotable lift pin 3 is present which is guided through the vertical opening 2d in the guide housing 2. The lift pin 3 can be lifted and lowered by a lift cylinder 4. The lift cylinder is connected at one end in articulated fashion to the lift pin 3 by way of an articulated joint 4a in articulated fashion and at the other end in articulated fashion to the base plate 2a and rotatably by way of a swivel joint 4b to the guide housing 2.

Access to the lift cylinder 4 is possible by way of a servicing shaft 2e in the guide housing 2. The lift and pivot device 1 furthermore comprises a guide frame 5 for carrying a cover 11 not illustrated here of a furnace (see also FIGS. 15 to 19), which has a support arm 5a. At an upper end of the support arm 5a is situated a region 5d which is equipped to connect to the cover 11 and furthermore has a lift nose 5b comprising a lift eye 5c.

The lift eye 5c can be brought into engagement with a tapering end 3a, facing away from the lift cylinder 4, of the lift pin 3. On account of the tapering design of the end 3a of the lift pin 3 the tolerances of the lift eye 5c are increased and a replacement of the lift eye 5c is therefore required only after very long periods of time. In the region of its other end the support arm 5a has two slide plates 2b, 2b' (see FIG. 2). The lateral faces of the slide rollers 6, 6' can roll on the two slide plates 2b, 2b' during the lifting and lowering of the lift cylinder 4.

Furthermore, a sealing device 7 of variable length is present which is fastened on one end to the guide housing 2 and on the other end to the end of the lift pin 3 facing the lift nose 5d. During the lifting and lowering of the lift cylinder 4 the lift pin 3 is moved in the direction of the lift nose 5a or away therefrom, wherein the sealing device 7 permanently radially surrounds the part of the lift pin 3 raised from the guide frame 5. The sealing device 7 in question here is a tubular bellows seal which prevents the penetration of contaminants between guide housing 2 and lift pin 3.

Figure 2:
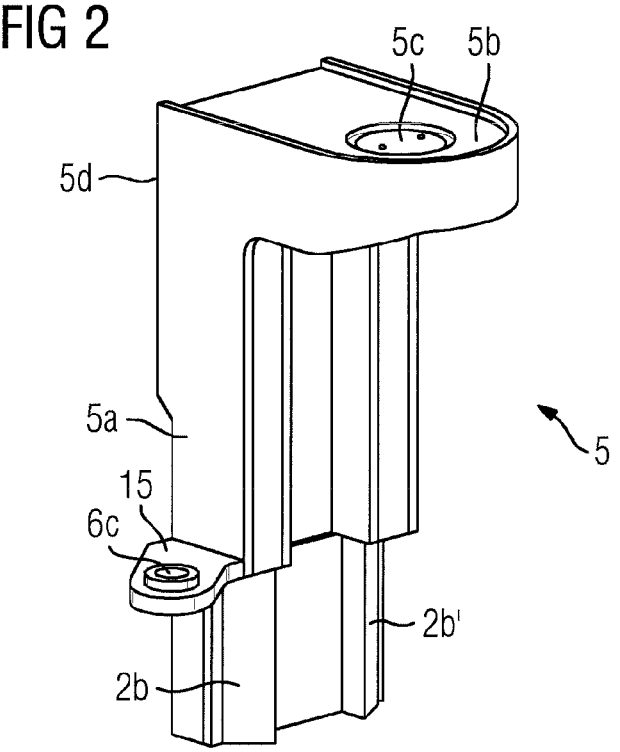
FIGS. 2 and 3 show three-dimensional views of the guide frame.
Figure 3:
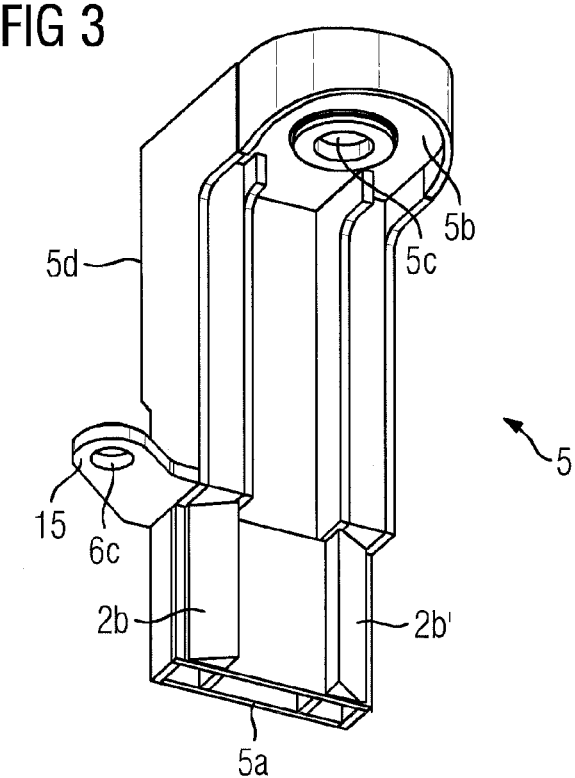

FIG. 2 and FIG. 3 show three-dimensional views of the guide frame 5. The same reference characters as in FIG. 1 identify the same elements. In this illustration, the slide plates 2b, 2b' oriented in a V-shape with respect to one another can be clearly seen. Furthermore, a holding fixture 15 having a centering opening 6c can be seen which is part of a centering device, with which a centering pin 2c is furthermore associated (see FIG. 4).

Figure 4:
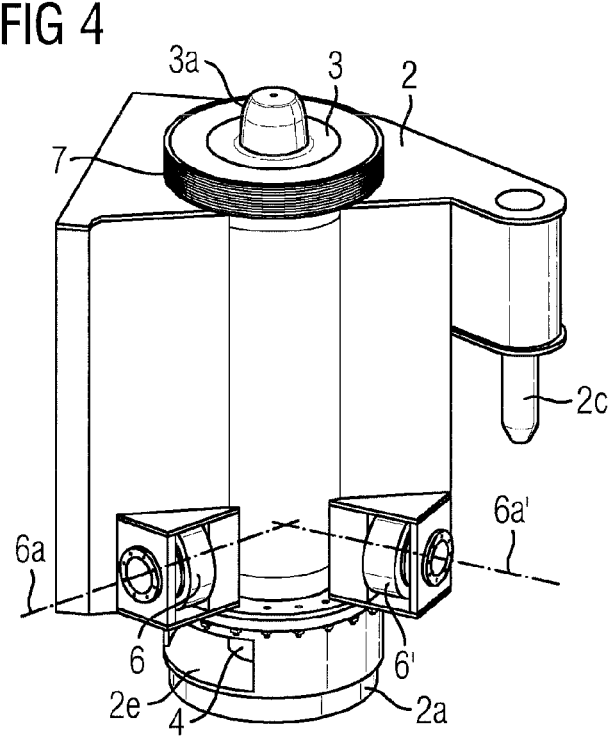
FIG. 4 shows a 3-dimensional illustration of the guide housing and the lift pin.

FIG. 4 shows a 3-dimensional illustration of the guide housing 2 and the lift pin 3 according to FIG. 1 and also the slide rollers 6, 6' with slide roller axes of rotation 6a, 6a' arranged in a V-shape with respect to one another. The same reference characters as in FIG. 1 identify the same elements. The servicing shaft 2e by way of which the lift cylinder 4 in the guide housing 2 is made accessible can also be seen here in detail.

Figure 5:
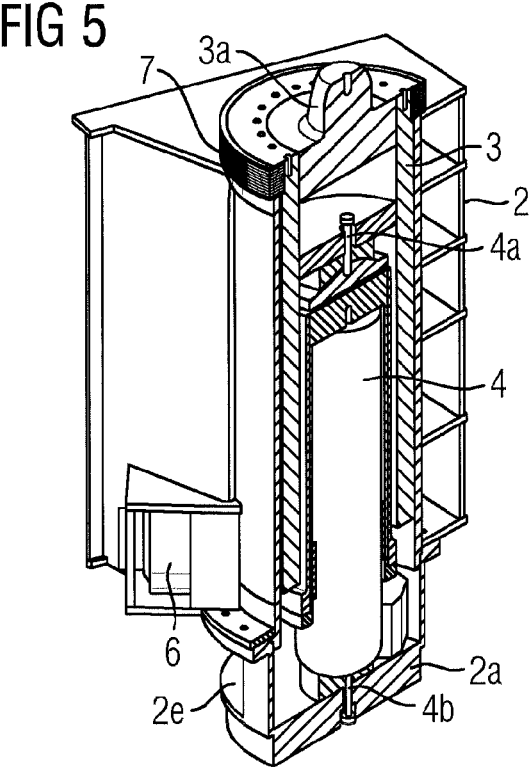
FIGS. 5 and 6 show 3-dimensional illustrations of the guide housing and the lift pin in longitudinal section.
Figure 6:
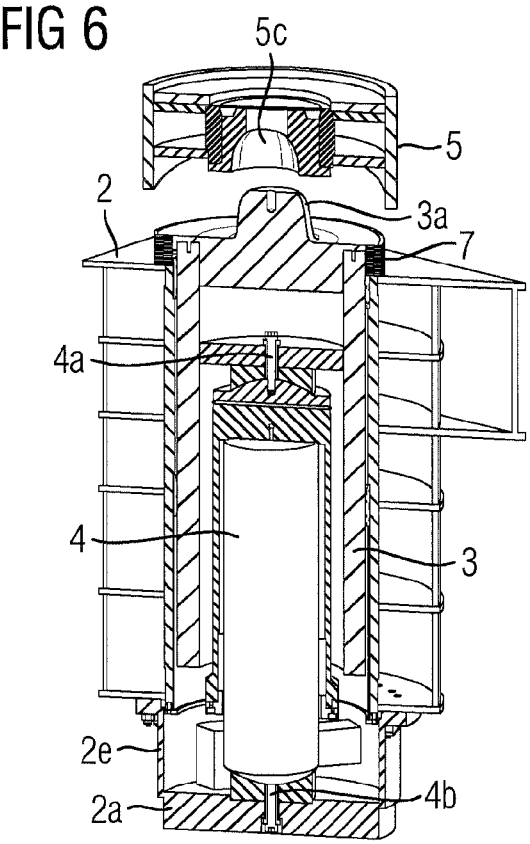

FIG. 5 and FIG. 6 show the guide housing 2 and the lift pin 3 according to FIG. 4 in longitudinal section. The lift cylinder 4 can also be seen in these illustrations. The interior of the lift pin 3 and the connection of the lift pin 3 to the lift cylinder 4 can be seen in detail. The same reference characters as in FIG. 1 identify the same elements.

Figure 7:
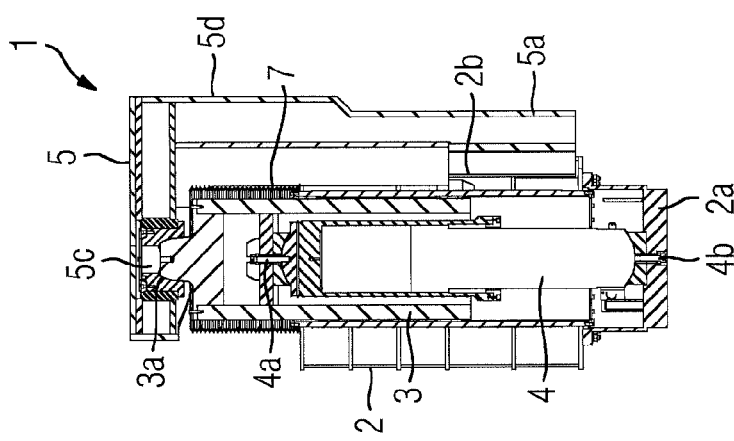
FIG. 7 shows a side view of the lift and pivot device according to FIG. 1.

FIG. 7 shows a side view of the lift and pivot device 1 with the guide housing 2 and the guide frame 5 looking toward the support arm 5a.

Figure 8:
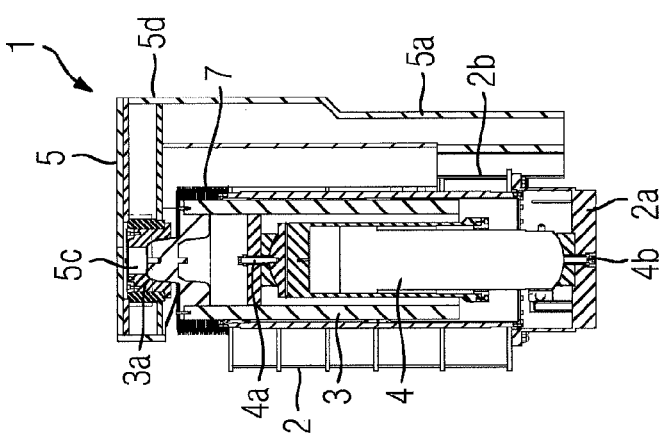
FIGS. 8 and 9 show the lift and pivot device according to FIG. 7 in longitudinal section.

FIG. 8 shows the section VIII-VIII according to FIG. 7, wherein the lift cylinder 4 is in a position in which the cover 11 is situated on the furnace vessel 10 (see FIGS. 15 to 19).

Figure 9:
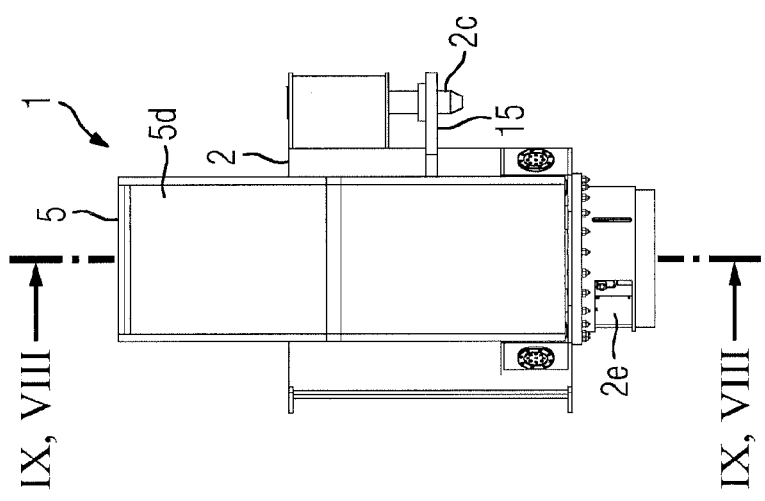

FIG. 9 shows the section IX-IX according to FIG. 7, wherein the lift cylinder 4 is in a position in which the cover 11 has been lifted from the furnace vessel 10 (see FIGS. 15 to 19). In this illustration it can be seen that the sealing device 7 makes a sealed connection between the lift pin 3 and the guide housing 2 even when the lift pin 3 is extended because the sealing device 7 is designed to be of variable length.

Figure 10:
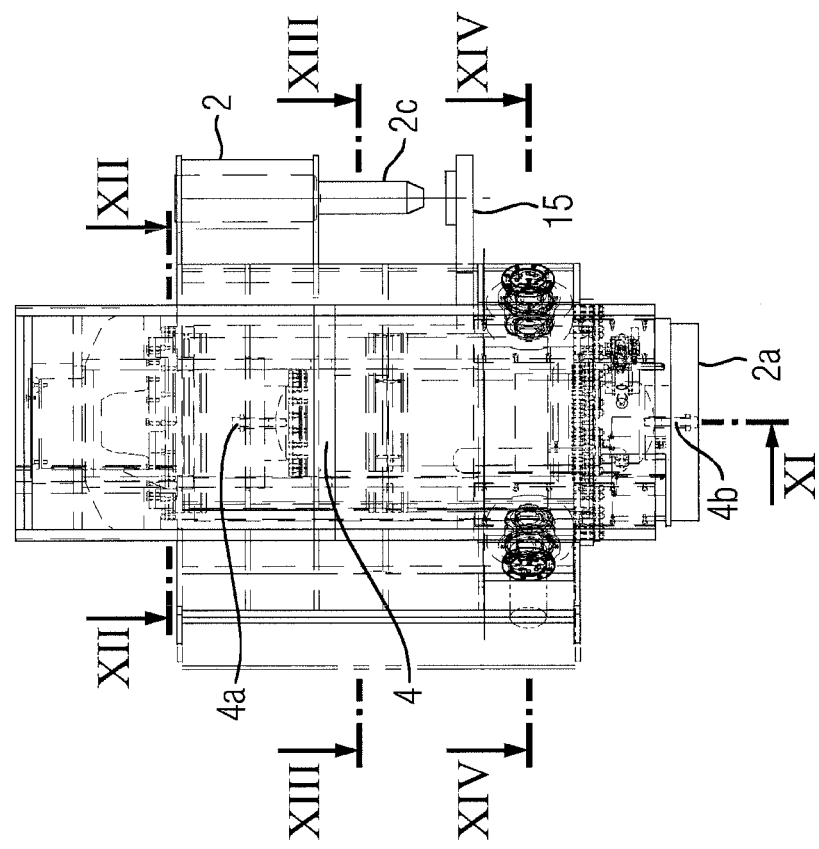
FIG. 10 shows a further side view of the lift and pivot device according to FIG. 1.

FIG. 10 shows a further side view of the lift and pivot device 1, in which the centering pin 2c is extended from the centering opening 6c of the holding fixture 15. In this position, the cover 11 is seated on the furnace vessel 10.

Figure 11:
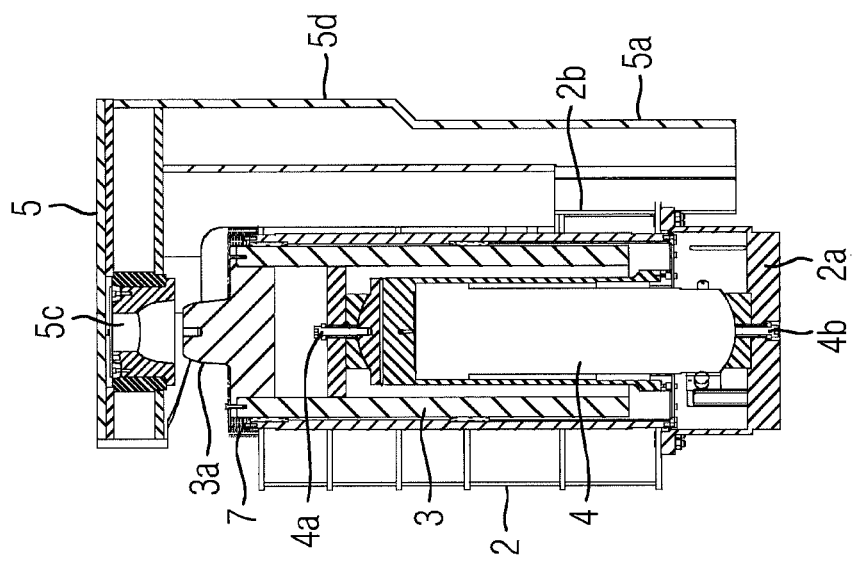
FIG. 11 shows a further side view of the lift and pivot device according to FIG. 10 in longitudinal section.
Figure 12:
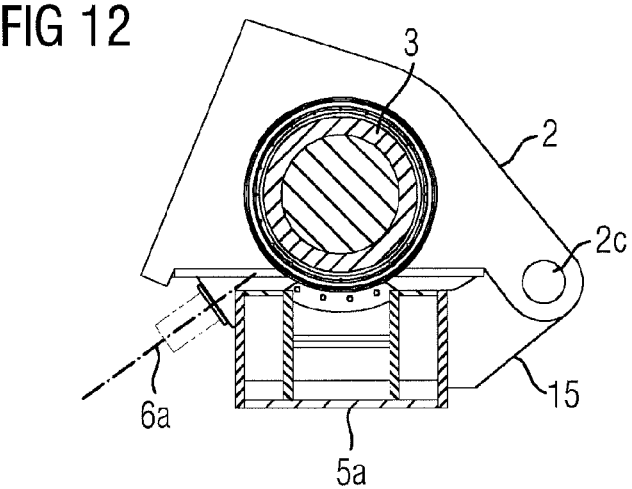
FIG. 12 shows the section XII-XII according to FIG. 10.
Figure 13:
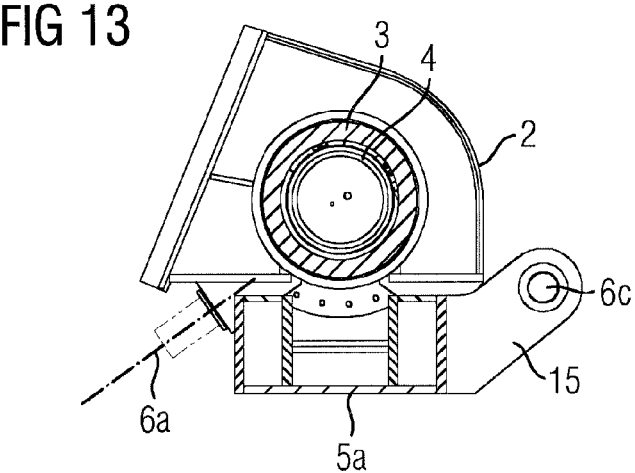
FIG. 13 shows the section XIII-XIII according to FIG. 10.
Figure 14:
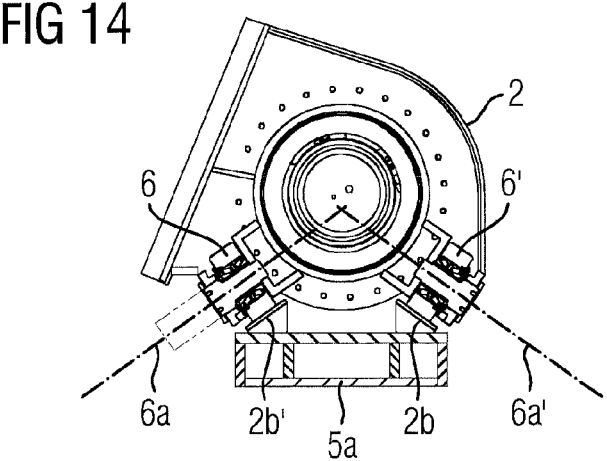
FIG. 14 shows the section XIV-XIV according to FIG. 10.

FIG. 11 shows a further side view of the lift and pivot device 1 according to FIG. 10 in longitudinal section. FIG. 12 shows the section XII-XII according to FIG. 10, FIG. 13 shows the section XIII-XIII according to FIG. 10 and FIG. 14 shows the section XIV-XIV according to FIG. 10.

Figure 16:
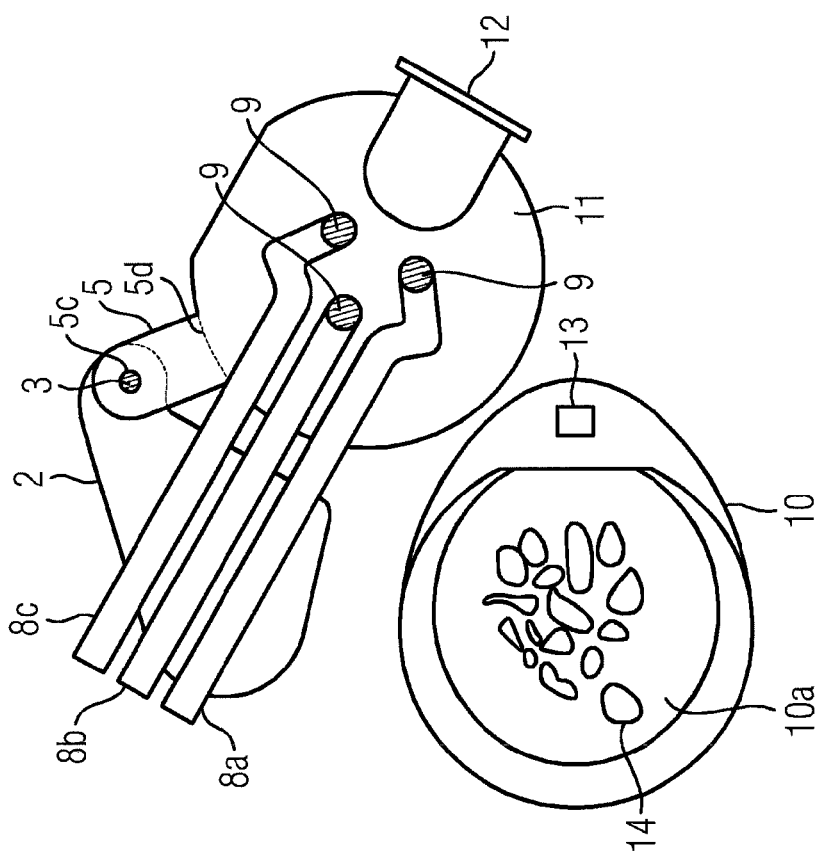
FIG. 16 shows a top view of the furnace system according to FIG. 15 in a charging position.
Figure 15:
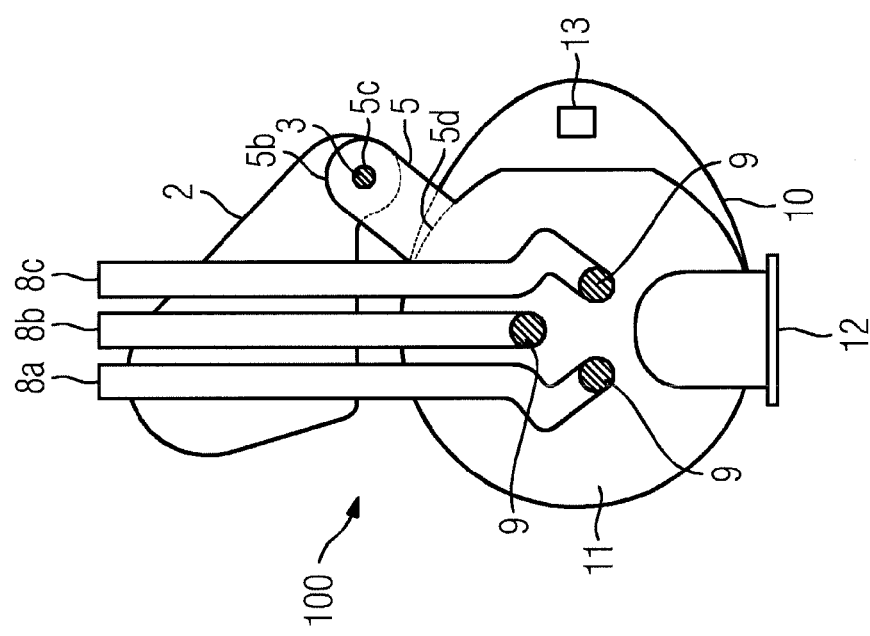
FIG. 15 shows a top view of a furnace system in an operating position.

FIGS. 15 and 16 then show a top view of a furnace system 100, wherein FIG. 15 shows the furnace system 100 in the operating position and FIG. 16 shows the furnace system 100 in a charging position. The furnace system 100 comprises a lift and pivot device, comprising a guide housing 2, a lift pin 3, a lift cylinder 4 not visible in this illustration and a guide frame 5. Furthermore, electrode carrying arms 8a, 8b, 8c are present which can be lifted and lowered with respect to the guide housing 2. The electrode carrying arms 8a, 8b, 8c are connected to electrodes 9 which pass through the cover 11. The cover 11 covers a furnace space 10a in a furnace vessel 10, wherein the furnace vessel 10 has a tapping facility 13.

On the cover 11 is situated a connection 12 for discharging off-gas from the furnace space 10a. In order to transport the cover 11 from the operating position according to FIG. 15 into a charging position according to FIG. 16, the lift pin 3 is lifted by the lift cylinder 4, with the end 3a of the lift pin 3 facing away from the lift cylinder 4 engaging in the lift eye 5c. By this means the guide frame 5 together with the cover 11 are lifted, with the slide rollers 6, 6' rolling on the slide plates 2b, 2b'. The guide housing 2 including the guide frame 5 and the cover 11 is then transported around a vertical axis of rotation from the operating position into the charging position in which the cover 11 uncovers the furnace vessel 10 or the furnace space 10a.

Charging into the furnace vessel 10 of charge material 14 to be melted then takes place, wherein the charge material 14 in question is in particular scrap metal. The guide housing 2 including the guide frame 5 and the cover 11 is then pivoted around the vertical axis of rotation from the charging position back into the operating position. The lift pin 3 is subsequently lowered by the lift cylinder 4, with the guide frame 2 together with the cover 11 being lowered and the slide rollers 6, 6' rolling on the slide plates 2b, 2b'. The cover 11 of the furnace system 100 is then situated in the operating position again, as illustrated in FIG. 15.

FIGS. 17 and 18 then show how servicing of the furnace system 100 can be carried out. FIG. 15 and FIG. 17 are identical in this situation and show the operating position of the cover 11 and also of the electrode carrying arms 8a, 8b, 8c with the electrodes 9. In order to service the furnace system 100, the lift pin 3 is then lowered by the lift cylinder 4, with the cover 11 remaining on the furnace vessel 10. The end 3a of the lift pin 3 facing away from the lift cylinder 4 slides out of the lift eye. At the same time the centering pin 2c slides out of the centering opening 6c and the two slide rollers 6, 6' are rolled on the slide plates 2b, 2b'. The guide housing 2, including the electrode carrying arms 8a, 8b, 8c including the electrodes 9 lifted previously by way of at least one further lift cylinder, not illustrated here, is then pivoted into a servicing position according to FIG. 18. The openings 9' for the electrodes 9 can now be seen in the cover 11.

In this servicing position, servicing work can then be carried out on the lift and pivot device 1 or another part of the furnace system 100, which is only possible after the guide housing 2 has been pivoted out or after the guide housing 2 has been detached from the guide frame 5. The guide housing 2 is subsequently pivoted back around the vertical axis of rotation from the servicing position back into the operating position according to FIG. 17. After the electrode carrying arms 8a, 8b, 8c have been lowered, with the electrodes 9 being introduced into the furnace vessel 10 by way of the openings 9' in the cover 11, melting of the charged charge material 14 in the furnace space 10a can take place.

Figure 19:
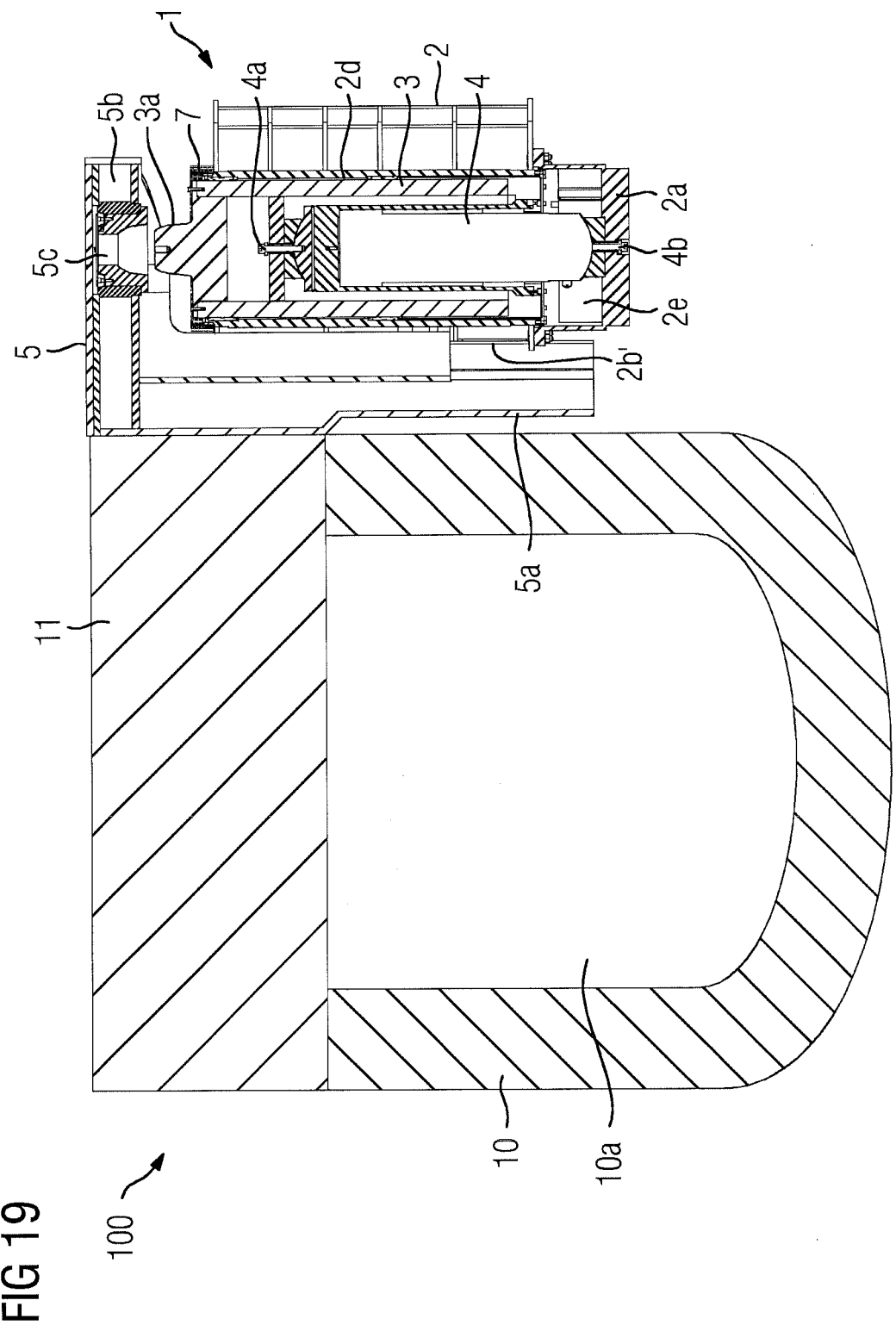
FIG. 19 shows a side view of a furnace system.

FIG. 19 then shows a side view in cross-section of a furnace system 100 comprising a furnace having a furnace vessel 10 in which is situated a furnace space 10a, and also having a cover 11. The furnace system 100 furthermore comprises a lift and pivot device 1 which is likewise illustrated in cross-section. The same reference characters for the lift and pivot device 1 as used in FIGS. 1 to 14 identify the same elements. In this situation FIG. 19 shows the furnace system 100 with the cover 11 lowered and the furnace vessel 10 closed.

FIGS. 1 to 19 naturally only show examples of the lift and pivot device and also the furnace system equipped therewith. The methods using the lift and pivot device are also only demonstrated schematically. It is thus possible in the case of the lift and pivot device to readily change the number of slide rollers and slide plates, the design of the end of the lift pin and of the lift eye corresponding thereto and also the design of the centering device without departing from the spirit of the proposals. Furthermore, the components of the furnace system, such as the furnace vessel, the tapping facility, the cover etc. can be embodied otherwise.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A lift and pivot device comprising
a guide housing having a base plate, a rotatably mounted slide roller and a vertical opening,
a lift pin which can be lifted and lowered inside the vertical opening in the guide housing,
a lift cylinder to lift and lower the lift pin, the lift cylinder being connected at one end in articulated fashion to the lift pin and at another end in articulated fashion and rotatably to the base plate, and
a guide frame to carry a cover of a furnace, the guide frame including a support arm having a first end and a second end, the first end being an upper end of the support arm and being equipped for connection to the cover, the first end including a lift nose having a lift eye which can be engaged with an end of the lift pin facing away from the lift cylinder; and
a slide plate at the second end of the support arm,
wherein a lateral face of the slide roller rolls on the slide plate during the lifting and lowering of the lift cylinder,
wherein the slide roller connects the guide housing to the guide frame such that movement of the guide frame with respect to the guide housing is via the slide roller.

2. The lift and pivot device as claimed in claim 1, wherein the slide roller is connected to an automatic lubricant supply system.

3. The lift and pivot device as claimed in claim 1, further comprising:

a sealing device of variable length fastened at one end on the guide housing and at another end on an end of the lift pin facing the lift nose, the sealing device radially surrounding a part of the lift pin raised in a direction of the lift nose from the guide frame during the lifting and lowering of the lift cylinder.

4. The lift and pivot device as claimed in claim 3, wherein the sealing device of variable length is formed by a tubular bellows seal.

5. The lift and pivot device as claimed in claim 1, wherein the slide roller is rotatable around a slide roller axis of rotation, the position of the slide roller axis of rotation being adjustable with respect to the guide housing.

6. The lift and pivot device as claimed in claim 1, wherein the end of the lift pin facing away from the lift cylinder is conically tapered or hemispherically tapered.

7. The lift and pivot device as claimed in claim 1, wherein
the slide roller is a first slide roller and the slide plate is a first slide plate,
the guide housing has a rotatably mounted second slide roller,
the lift and pivot device further comprises a second slide plate at the second end of the support arm, and
a lateral face of the second slide roller rolls on the second slide plate during the lifting and lowering of the lift cylinder.

8. The lift and pivot device as claimed in claim 7, wherein:
the first and second slide rollers are rotatable around first and second slide roller axes of rotation, respectively,
the first and second slide roller axes of rotation lie in a horizontal plane and are oriented in a V-shape with respect to one another, wherein a tip of the V, which corresponds to a virtual point of intersection of the first and second slide roller axes of rotation, points away from the guide frame.

9. The lift and pivot device as claimed in claim 1, further comprising:
a centering device to position the guide frame with respect to the guide housing when the lift pin has been lifted.

10. The lift and pivot device as claimed in claim 1, further comprising:
at least one electrode carrying arm, which is liftable and pivotable with respect to the guide housing, being connected to the guide housing.

11. A furnace system comprising:
the lift and pivot device as claimed in claim 1;
a furnace having a furnace vessel; and
the cover,
wherein the lift and pivot device is connected to the cover, the cover is fastened on an upper end of the guide frame with respect to the lift nose on the support arm and the guide housing is arranged pivotably around a vertical axis of rotation with respect to the furnace vessel.

12. A method for use with the furnace system as claimed in claim 11, the method comprising:
lifting the lift pin via the lift cylinder, wherein the end of the lift pin facing away from the lift cylinder engages with the lift eye, the guide frame together with cover is lifted and the slide plate is moved upward on the slide roller;
pivoting the guide housing including the guide frame and the cover around a vertical axis of rotation from an operating position in which the furnace vessel is closed by the cover into a charging position in which the cover uncovers the furnace vessel;
charging the furnace vessel with charge material to be melted;
pivoting the guide housing including the guide frame and the cover around the vertical axis of rotation from the charging position back into the operating position; and
lowering the lift pin via the lift cylinder, wherein the guide frame together with cover is lowered and the slide plate is moved downward on the slide roller.

13. The method as claimed in claim 12, comprising:
lowering the lift pin via the lift cylinder in an operating position in which the furnace vessel is closed by the cover, wherein the end of the lift pin facing away from the lift cylinder slides out of the lift eye and the slide plate is moved downward on the slide roller;
pivoting the guide housing around a vertical axis of rotation from an operating position into a servicing position, wherein the cover remains on the furnace vessel,
servicing the lift and pivot device (1) or another part of the furnace system, and
pivoting the guide housing around the vertical axis of rotation from the servicing position back into the operating position.

14. The method as claimed in claim 13, wherein
the lift and pivot device further comprises at least one electrode carrying arm, which is liftable and pivotable with respect to the guide housing, connected to the guide housing,
the method further comprising:
prior to the pivoting of the guide frame around the vertical axis of rotation from the operating position into the charging position or servicing position, lifting the at least one electrode carrying arm with respect to the guide housing and the cover, and
after the pivoting of the guide housing around the vertical axis of rotation from the charging position or servicing position back into the operating position, lowering the at least one electrode carrying arm with respect to the guide housing and the cover.

15. The lift and pivot device as claimed in claim 1, wherein the furnace is an electric arc furnace.

16. The lift and pivot device as claimed in claim 5, wherein the furnace is an electric arc furnace.

17. The lift and pivot device as claimed in claim 8, wherein the furnace is an electric arc furnace.

18. The lift and pivot device as claimed in claim 10, wherein the furnace is an electric arc furnace.

19. The furnace system as claimed in claim 11, wherein the furnace is an electric arc furnace.

20. The method as claimed in claim 12, wherein the furnace is an electric arc furnace.

* * * * *